United States Patent
Hsiao et al.

(10) Patent No.: US 11,872,839 B2
(45) Date of Patent: Jan. 16, 2024

(54) WHEEL

(71) Applicant: ADVANCED INTERNATIONAL MULTITECH CO., LTD., Kaohsiung (TW)

(72) Inventors: Te-Fu Hsiao, Kaohsiung (TW); Che-Hao Kuo, Kaohsiung (TW); Chung-Hsin Chang, Kaohsiung (TW); Chia-Hsin Wang, Kaohsiung (TW)

(73) Assignee: ADVANCED INTERNATIONAL MULTITECH CO., LTD., Kaohsiung (TW)

( * ) Notice: Subject to any disclaimer, the term of this patent is extended or adjusted under 35 U.S.C. 154(b) by 335 days.

(21) Appl. No.: 17/244,502

(22) Filed: Apr. 29, 2021

(65) Prior Publication Data

US 2022/0144011 A1 May 12, 2022

(30) Foreign Application Priority Data

Nov. 11, 2020 (TW) ................................ 109139319

(51) Int. Cl.
*B60B 1/14* (2006.01)
*B60B 5/02* (2006.01)
*B60B 23/10* (2006.01)
*B60B 23/08* (2006.01)

(52) U.S. Cl.
CPC .................. *B60B 1/14* (2013.01); *B60B 5/02* (2013.01); *B60B 23/08* (2013.01); *B60B 23/10* (2013.01); *B60B 2360/3416* (2013.01); *B60B 2900/511* (2013.01)

(58) Field of Classification Search
CPC .. B60B 1/06; B60B 1/14; B60B 1/114; B60B 3/10; B60B 3/41; B60B 5/02; B60B 7/01;
(Continued)

(56) References Cited

U.S. PATENT DOCUMENTS

| 1,784,708 A | * | 12/1930 | Pugh | .......................... B60B 3/14 |
| | | | | 411/378 |
| 7,681,958 B1 | * | 3/2010 | Bagdasarian | ............. B60B 1/14 |
| | | | | 301/67 |

(Continued)

FOREIGN PATENT DOCUMENTS

| CN | 103885318 | * | 6/2014 | ........... G04B 18/006 |
| CN | 106985605 | * | 7/2017 | ............. B60B 21/06 |

(Continued)

*Primary Examiner* — Kip T Kotter
*Assistant Examiner* — Eva L Comino
(74) *Attorney, Agent, or Firm* — MUNCY, GEISSLER, OLDS & LOWE, P.C.

(57) ABSTRACT

A wheel includes a spoke having a mounting hole that extends in a radial direction, and a blind hole that extends in an axial direction and that is in spatial communication with the mounting hole. The wheel includes a rim having a second through hole that is aligned with the mounting hole. The wheel further includes a connecting unit connecting the spoke with the rim. The connecting unit includes a rod extending through the through hole into the mounting hole and having an engaging hole that is aligned with the blind hole. The connecting unit further includes a fastener extending through the blind hole into the engaging hole and engaging with the engaging hole.

6 Claims, 3 Drawing Sheets

(58) Field of Classification Search
CPC .... B60B 7/02; B60B 7/04; B60B 7/18; B60B 21/06; B60B 23/06; B60B 23/08; B60B 23/10; B60B 3/041; B60B 2310/305; B60B 2360/34; B60B 2360/3416; F16B 12/14; F16B 12/30; F16B 37/047
USPC .................................. 411/104, 106; 301/67
See application file for complete search history.

(56) References Cited

U.S. PATENT DOCUMENTS

| | | | | |
|---|---|---|---|---|
| 8,973,909 | B2 * | 3/2015 | Noble | B60G 9/00 267/293 |
| 9,080,586 | B2 * | 7/2015 | Liu | F16B 12/14 |
| 9,194,410 | B2 * | 11/2015 | Davies | F16B 15/04 |
| 9,815,321 | B2 * | 11/2017 | Schlanger | B60B 31/02 |
| 10,377,172 | B2 * | 8/2019 | Werner | B60B 23/08 |
| 10,583,688 | B2 * | 3/2020 | Werner | B60B 23/10 |
| 11,566,656 | B2 * | 1/2023 | Bensussan | F16B 12/14 |
| 2006/0267399 | A1 * | 11/2006 | Okajima | B60B 21/062 301/124.1 |
| 2013/0259596 | A1 * | 10/2013 | Nambara | F16B 39/00 411/166 |

FOREIGN PATENT DOCUMENTS

| | | | | |
|---|---|---|---|---|
| JP | 3905586 | * | 4/2007 | |
| WO | WO2016066769 | * | 5/2016 | ................ F60B 3/04 |

* cited by examiner

WHEEL

CROSS-REFERENCE TO RELATED APPLICATION

This application claims reference to Taiwanese Invention Patent Application No. 109139319, filed on Nov. 11, 2020.

FIELD

The disclosure relates to a wheel.

BACKGROUND

A conventional wheel for a vehicle is made of a metal material such as an aluminium alloy, and includes a rim and a plurality of spokes. The rim is connected to the spokes via a plurality of screws.

One reason why the conventional wheel uses screws for connecting the rim to the spokes is that threaded holes can be easily tapped on metal materials. Note that these threaded holes are necessary for the fastening of the screws onto the conventional wheel.

However, new materials, such as carbon fibre composite material, have been introduced for the manufacture of wheels. In the case of a conventional wheel made of carbon fibre composite material, attempting to tap the conventional wheel to form a threaded hole will likely create fractures and damage the structural integrity of the conventional wheel. Additionally, even in the event that threaded holes were successfully tapped on the conventional wheel without causing any damage, fractures may occur on a surface of the conventional wheel while fastening the screw.

Therefore, an object of the disclosure is to provide a wheel that can alleviate at least one of the drawbacks of the prior art.

SUMMARY

According to the disclosure, the wheel includes a spoke formed with a mounting hole that extends in a radial direction of the wheel. The spoke is further formed with a blind hole that extends in an axial direction perpendicular to the radial direction and that is in spatial communication with the mounting hole.

The wheel further includes a rim connected to the spoke. The rim is formed with a through hole that extends in the radial direction and that is aligned with the mounting hole.

The wheel further includes a connecting unit connecting the spoke and the rim. The connecting unit includes a rod extending through the through hole into the mounting hole. The rod is formed with an engaging hole that extends in the axial direction and that is aligned with the blind hole. The connecting unit further includes a fastener extending through the blind hole into the engaging hole and engaging with the engaging hole.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
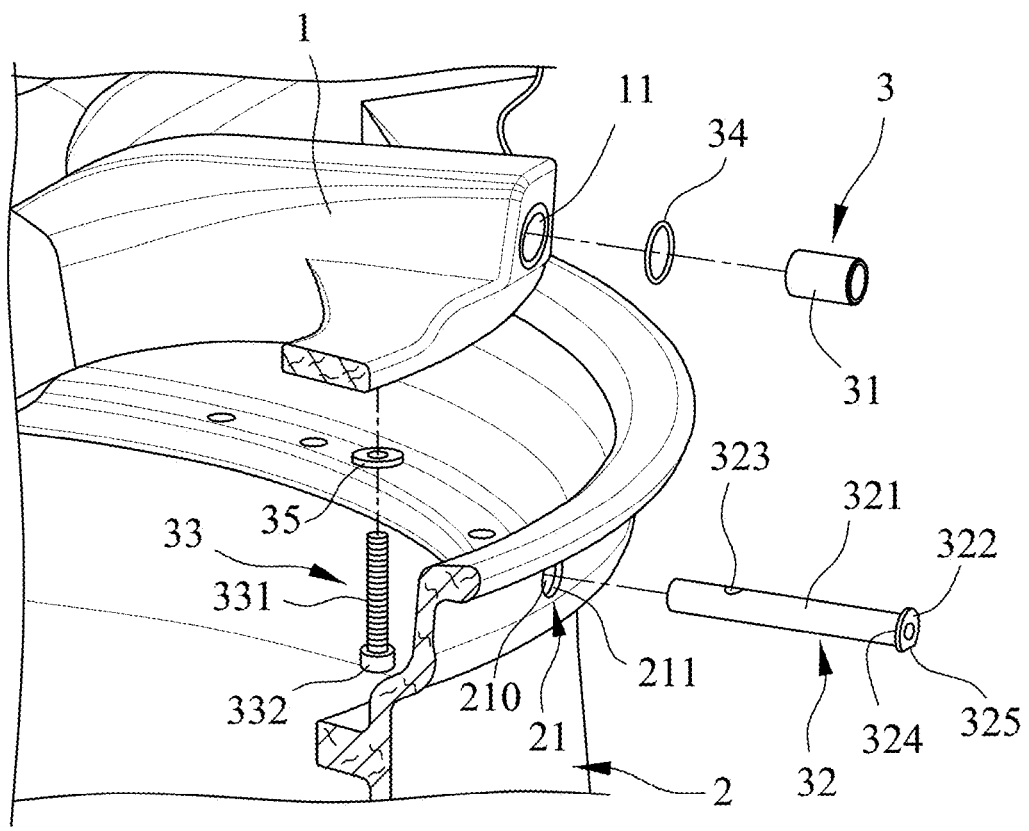
FIG. 1 is a fragmentary exploded perspective view illustrating a wheel according to an embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
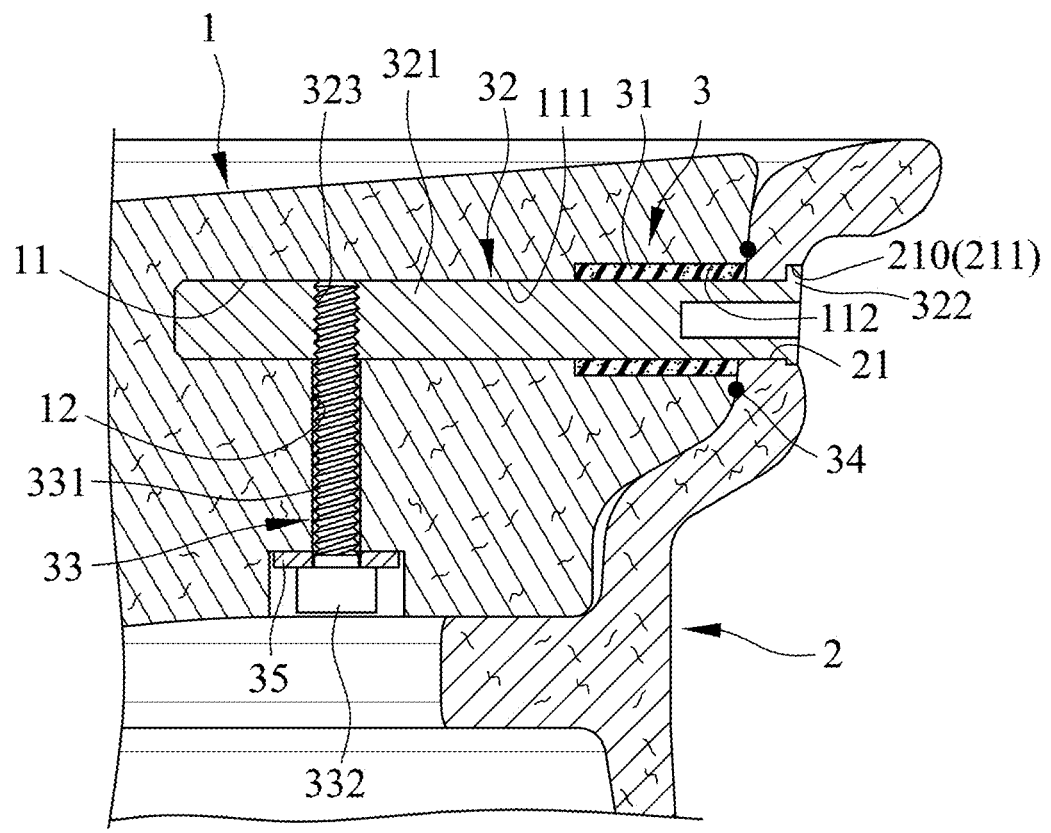
FIG. 2 is a fragmentary sectional view of the wheel according to an embodiment of this disclosure.
Figure 3:
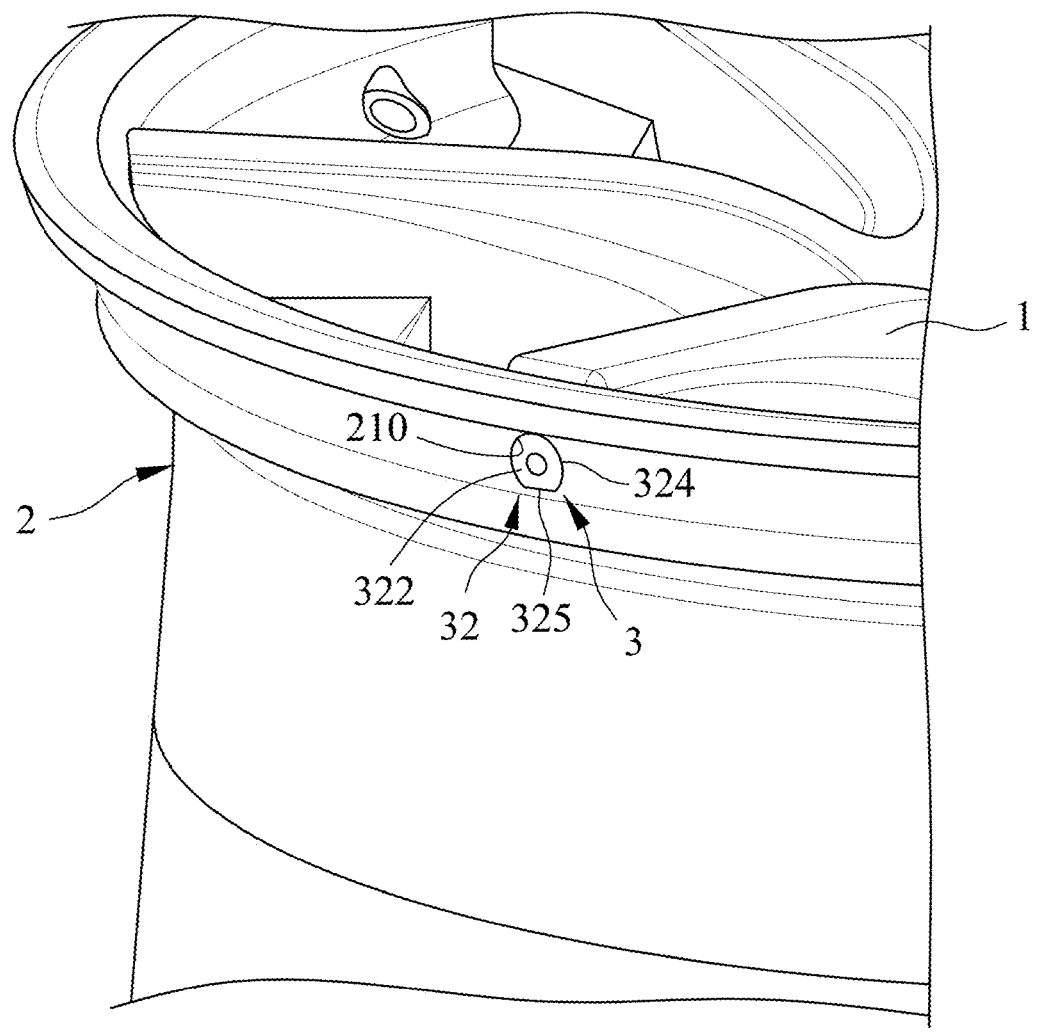
FIG. 3 is a fragmentary perspective view of the wheel according to an embodiment of this disclosure.

Referring to FIGS. 1, 2 and 3, an embodiment of a wheel is shown. The wheel includes a plurality of spokes 1 (only one is shown), a rim 2 that surrounds and is connected to the spokes 1, and a plurality of connecting units 3 (only one is shown) that connect the spokes 1 to the rim 2, respectively. In some embodiments, the wheel may further include a center disk (not shown), and each of the spokes 1 has one end fixedly connected to the center disk and the other end detachably connected to the rim 2. Since the spokes 1 are all identical to each other, only one of the spokes 1 will be described in the following.

The spoke 1 is formed with a mounting hole 11 that extends in a corresponding radial direction of the wheel, and a blind hole 12 that extends in an axial direction perpendicular to the radial direction and that is in spatial communication with the mounting hole 11.

The rim 2 is formed with a plurality of through holes 21 (only one is shown). The through holes 21 respectively extend in different radial directions, and are aligned respectively with the mounting holes 11 of the spokes 1. It should be noted that only one of the through holes 21 will be described in the following. The through hole 21 has an internal surface 211, and the internal surface 211 defines an opening 210 of the through hole 21.

In this embodiment, the spokes 1 and the rim 2 are made of carbon fibre composite material.

Each of the connecting units 3 includes a rod 32, a fastener 33, a sleeve 31, a sealing ring 34 and a washer 35. Each of the connecting units 3 corresponds to the mounting hole 11 and blind hole 12 of the respective one of the spokes 1, and to one of the through holes 21 that is aligned with the mounting hole 11 of the respective one of the spokes 1. The following description will be made with respect to an individual connecting unit 3, the corresponding spoke 1, the corresponding mounting hole 11, the corresponding blind hole 12, and the corresponding through hole 21.

The rod 32 extends through the through hole 21 of the rim 2 into the mounting hole 11 of the spoke 1. The rod 32 is formed with an engaging hole 323 that extends in the axial direction and that is aligned with the blind hole 12 when the rod 32 is disposed in the mounting hole 11. The rod 32 has a rod body 321 that is formed with the engaging hole 323, and a head portion 322 that is connected to the rod body 321 at a position opposite to the engaging hole 323 and that engages with a portion of the through hole 21. In this embodiment, the engaging hole 323 of the rod 32 is a threaded hole, and the fastener 33 of the connecting unit 3 is a screw used for screwing onto the engaging hole 323 of the rod 32.

Viewing in the radial direction, the head portion 322 of the rod 32 has a contour that has a shape substantially of a major segment of a circle, and the opening 210 of the through hole 21 matches with the head portion 322.

More specifically, the head portion 322 has a curved surface 324 corresponding to an arc of the major segment of the circle and having two opposite ends. The head portion 322 further has a planar surface 325 corresponding to a chord of the circle that cooperates with the arc to define the major segment and being connected between the two opposite ends of the curved surface 324. The curved surface 324 and the planar surface 325 fittingly abut against the internal surface 211 of the through hole 21.

Therefore, because the contour of the head portion 322 matches the opening 210 of the through hole 21 (see FIG. 3), the through hole 21 will restrict the head portion 322 and prevent rotation of the rod 3. As a result, it can be ensured that the engaging hole 323 of the rod 32 can be accurately aligned with the blind hole 12.

The sleeve 31 of the connecting unit 3 is disposed in the mounting hole 11 of the spoke 1 and is fitted over the rod 32. The mounting hole 11 formed in the spoke 1 has two cylindrical sections (see FIG. 2), namely, a narrow section 111 and a wide section 112 that is close to an opening of the mounting hole 11. The wide section 112 is made larger in diameter than the narrow section 111, in order to accommodate the sleeve 31 which will then fill any remaining space between an outer surface of the rod 32 and an inner surface of the mounting hole 11.

The sealing ring 34 of the connecting unit 3 surrounds the sleeve 31 of the connecting unit 3, and is sandwiched between the spoke 1 and the rim 2. The rod 32 extends through the sealing ring 34. The sealing ring 34 is made of a silicone material and is able to seal a gap between the spoke 1 and the rim 2.

The fastener 33 of the connecting unit 3 extends through the blind hole 12 of the rim 2 into the engaging hole 323 of the rod 32, and engages with the engaging hole 323. The fastener 33 has a threaded shank 331 screwing into the engaging hole 323, and a screw head 332 connected to the threaded shank 331. The threaded shank 331 extends through the washer 35, and the washer 35 is sandwiched between the screw head 332 and the spoke 1.

It should be noted that the mounting hole 11 is formed by boring into the spoke 1, which is made of carbon fibre composite material. The boring generally has a tolerance. Due to the tolerance, the mounting hole 11 may have an inner diameter different from an outer diameter of the rod 32 and/or may be misaligned with the through hole 21. Such difference and/or misalignment will result in a space between the outer surface of the rod 32 and the inner surface of the mounting hole 11, and cause the rod 32 to be disposed at a slight angle when inserted in the through hole 21 and the mounting hole 11, which then causes misalignment of the engaging hole 323 of the rod 32 with the blind hole 12 of the spoke 1 and causes the fastener 33 to have difficulty engaging the engaging hole 323. Therefore, having the sleeve 31 as part of the connecting unit 3 in the wheel will help to ensure that the rod 32 is properly disposed in the mounting hole 11, and thereby ensure that the blind hole 12 of the spoke 1 is accurately aligned with the engaging hole 323 of the rod 32.

The following description provides a detailed description on a method for assembling the wheel and clarifying how various components of the wheel cooperate. However, the following description is only for the purpose of explanation, and the disclosure should not be limited thereto.

Referring to FIGS. 1, 2 and 3, for each of the connecting units 3, the sleeve 31 is inserted into the mounting hole 11 of the corresponding spoke 1. Then, the sealing ring 34 is placed on an outer surface of the spoke 1 that has the opening of the mounting hole 11 to surround one end of the sleeve 31 that is close to the opening of the mounting hole 11. Next, the spoke 1 is positioned within the rim 2 with the mounting hole 11 being aligned with the corresponding through hole 21 of the rim 2, and the rod body 321 of the rod 32 is inserted through the through hole 21 and into the mounting hole 11. When the head portion 322 of the rod 32 engages with the opening 210 of the through hole 21, the rod 32 will be completely inserted into the mounting hole 11 and the engaging hole 323 of the rod body 321 of the rod 32 will be aligned with the blind hole 12 of the spoke 1 (see FIG. 2). After the rod 32 is inserted completely into the mounting hole 11, the fastener 33 is extended through the washer 35 and then through the blind hole 12, and a distal end of the threaded shank 331 is inserted into the engaging hole 323 and is screwed with a thread of the engaging hole 323. When the fasteners 33 of the connecting units 3 are all screwed respectively with the engaging holes 323 of the rods 32 of the connecting units 3 and are sufficiently tightened, the assembly of the wheel is completed.

In summary, because a thread of an individual fastener 33 is used to screw with the engaging hole 323 and is not used for screwing with the blind hole 12, and the rod 32 is secured by the fastener 33 instead of being threaded into the through hole 12 and the mounting hole 11, the spokes 1 and the rim 2 do not require the tapping of any thread to attach the rim 2 to the spokes 1. Specifically, the blind holes 12, the mounting holes 11 of the spokes 1 and the through holes 21 of the rim 2 can all be drilled as non-threaded holes into the carbon fibre composite material. Since no screw is directly screwed onto the spokes 1 and the rim 2 that are made of carbon fibre composite material, fractures that may be created when fastening a screw to a conventional wheel can also be avoided. Furthermore, the gap between each spoke 1 and the rim 2 of the wheel according to embodiments of this disclosure is also well sealed with the connecting unit 3.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A wheel comprising:
a spoke formed with a mounting hole that extends in a radial direction of said wheel, and blind hole that extends in an axial direction perpendicular to the radial direction and that is in spatial communication with said mounting hole;
a rim connected to said spoke and formed with a through hole that extends in the radial direction and that is aligned with said mounting hole; and
a connecting unit connecting said spoke with said rim and including
a rod extending through said through hole into said mounting hole, and being formed with an engaging hole that extends in the axial direction and that is aligned with said blind hole, and
a fastener extending through said blind hole into said engaging hole and engaging with said engaging hole;
wherein said rod includes a rod body that is formed with said engaging hole, and a head portion that is connected to said rod body at a position opposite to said engaging hole and that engages with a portion of said through hole;
wherein viewing in the radial direction, said head portion has a contour that has a shape substantially of a major segment of a circle, and said through hole has an opening matching with said head portion;
wherein said rim has an internal surface that defines said opening of said through hole;
wherein said head portion has
a curved surface corresponding to an arc of the major segment and having two opposite ends, and
a planar surface corresponding to a chord of the circle that cooperates with the arc to define the major segment, and being connected between said two opposite ends of said curved surface; and
wherein said curved surface and said planar surface fittingly abut against said internal surface.

2. The wheel as claimed in claim 1, wherein said connecting unit further includes a sleeve disposed in said mounting hole and fitting over said rod.

3. The wheel as claimed in claim 2, wherein said connecting unit further includes a sealing ring surrounding said sleeve and being sandwiched between said spoke and said rim.

4. The wheel as claimed in claim 1, wherein said engaging hole is a threaded hole, and said fastener is a screw screwing into said engaging hole.

5. The wheel as claimed in claim 4, wherein said fastener has a threaded shank screwing into said engaging hole and a screw head connected to said threaded shank, and said connecting unit further includes a washer through which said threaded shank extends and which is sandwiched between said screw head and said spoke.

6. The wheel as claimed in claim 1, wherein said spoke and said rim are made of carbon fibre composite material.

* * * * *